US009122957B2

(12) United States Patent
Kato (10) Patent No.: US 9,122,957 B2
(45) Date of Patent: Sep. 1, 2015

(54) IMAGE PROCESSING APPARATUS, IMAGE PROCESSING METHOD, AND NON-TRANSITORY COMPUTER READABLE MEDIUM (71) Applicant: FUJI XEROX CO., LTD, Minato-ku, Tokyo (JP)

(72) Inventor: Noriji Kato, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 0 days.

(21) Appl. No.: 14/296,594

(22) Filed: Jun. 5, 2014

(65) Prior Publication Data

US 2015/0146974 A1 May 28, 2015

(30) Foreign Application Priority Data

Nov. 27, 2013 (JP) ................................. 2013-244842

(51) Int. Cl.
*G06K 9/62* (2006.01)
(52) U.S. Cl.
CPC ............ *G06K 9/6262* (2013.01); *G06K 9/6269* (2013.01)
(58) Field of Classification Search
CPC ............................ G06K 9/00241; G06K 9/629

USPC ......... 382/159, 118, 181, 263, 305, 278, 176, 382/254
See application file for complete search history.

(56) References Cited

U.S. PATENT DOCUMENTS

2014/0079297 A1* 3/2014 Tadayon et al. ................ 382/118

OTHER PUBLICATIONS

Svetlana Lazebnik et al., "Beyond Bags of Features: Spatial Pyramid Matching for Recognizing Natural Scene Categories", Proceedings of the 2006 IEEE Computer Society Conference on Computer Vision and Pattern Recognition, pp. 2169-2178, 2006.

* cited by examiner

*Primary Examiner* — Mike Rahmjoo
(74) *Attorney, Agent, or Firm* — Sughrue Mion, PLLC (57) ABSTRACT

An image processing apparatus includes a first acquiring unit that acquires an image to be processed; a setting unit that sets multiple partial image areas in the image to be processed; a second acquiring unit that acquires a first classification result indicating a possibility that an object of a specific kind is included in each of the multiple partial image areas; and a generating unit that generates a second classification result indicating a possibility that the object of the specific kind is included in the image to be processed on the basis of the first classification result of each of the multiple partial image areas.

11 Claims, 9 Drawing Sheets

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-244842 filed Nov. 27, 2013.

BACKGROUND

Technical Field

The present invention relates to an image processing apparatus, an image processing method, and a non-transitory computer readable medium.

SUMMARY

According to an aspect of the invention, there is provided an image processing apparatus including a first acquiring unit, a setting unit, a second acquiring unit, and a generating unit. The first acquiring unit acquires an image to be processed. The setting unit sets multiple partial image areas in the image to be processed. The second acquiring unit acquires a first classification result indicating a possibility that an object of a specific kind is included in each of the multiple partial image areas. The generating unit generates a second classification result indicating a possibility that the object of the specific kind is included in the image to be processed on the basis of the first classification result of each of the multiple partial image areas.

BRIEF DESCRIPTION OF THE DRAWINGS

Exemplary embodiments of the present invention will be described in detail based on the following figures, wherein.

DETAILED DESCRIPTION

Exemplary embodiments of the present invention will herein be described with reference to the attached drawings. An image processing apparatus 10 according to an exemplary embodiment is a computer that causes a classifier to learn the image features of one or more kinds of objects and executes a process to classify an object (body) in an image to be processed with the classifier.

An outline of exemplary processes performed by the image processing apparatus 10 according to the present exemplary embodiment will now be described. The image processing apparatus 10 sets one or more partial image areas for a sample image in which the kind of an object that is taken is identified and executes a learning process for every object kind with the classifier on the basis of the image feature of the partial image area that is set. The image processing apparatus 10 sets multiple partial image areas for a target image in which the kind of an object that is taken is not identified, executes a classification process with the classifier on the basis of the image features of the multiple partial image areas that are set, and integrates the results of the classification of the multiple partial image areas with each other to determine information about the object that is taken in the target image.

[1. Description of Functional Blocks]

Exemplary functions of the image processing apparatus 10 according to the present exemplary embodiment will now be described with reference to functional block diagrams illustrated in FIG. 1 and FIG. 2.

[1-1. Description of Functional Blocks Concerning Learning Process]

Figure 1:
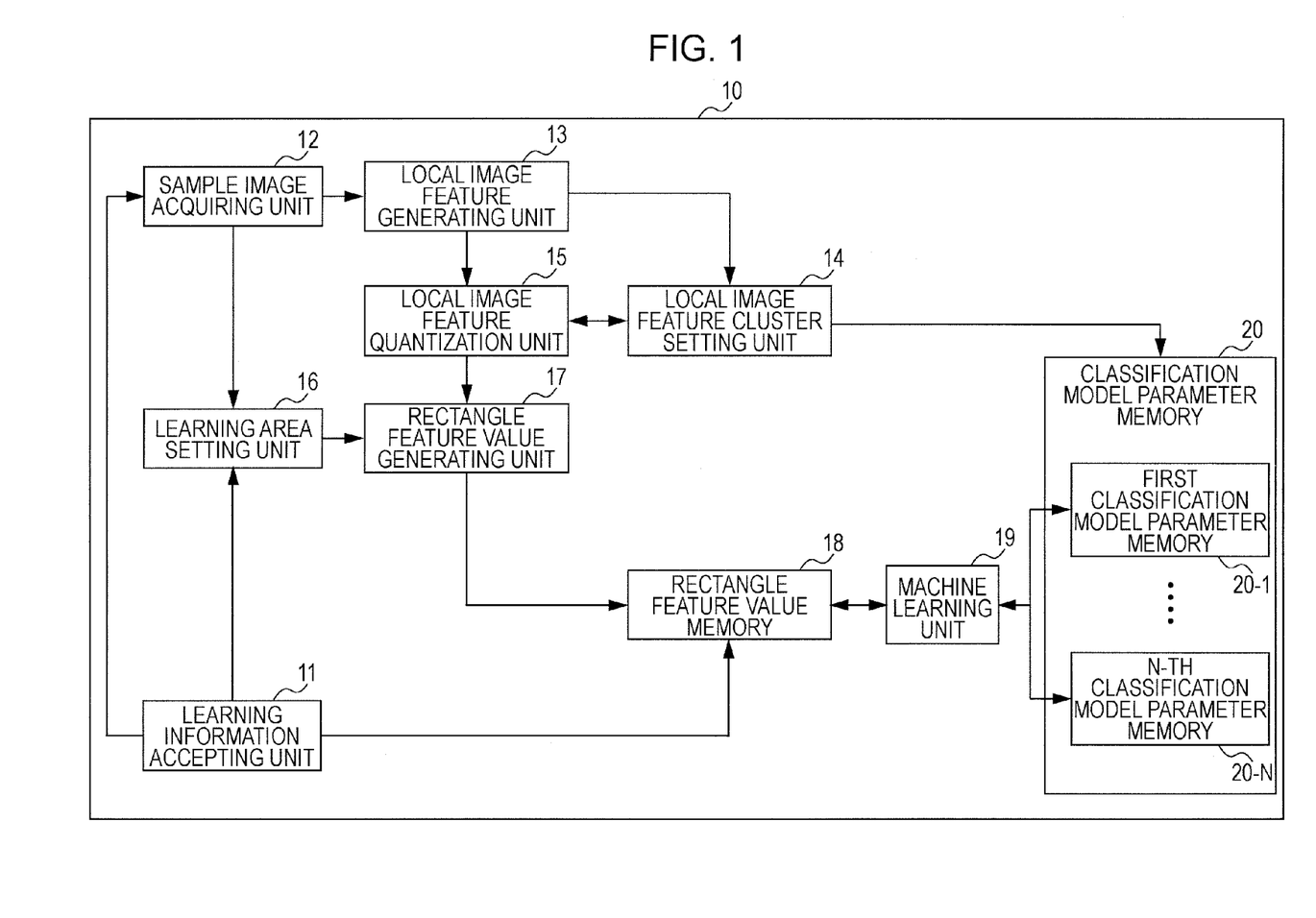
FIG. 1 illustrates exemplary functions of an image processing apparatus according to an exemplary embodiment concerning a learning process.

FIG. 1 illustrates exemplary functions concerning a process to learn the image feature of an object with a machine learning model (classifier), among the functions of the image processing apparatus 10.

Referring to FIG. 1, the image processing apparatus 10 includes a learning information accepting unit 11, a sample image acquiring unit 12, a local image feature generating unit 13, a local image feature cluster setting unit 14, a local image feature quantization unit 15, a learning area setting unit 16, a rectangle feature value generating unit 17, a rectangle feature value memory 18, a machine learning unit 19, and a classification model parameter memory 20.

The functions of the blocks in the image processing apparatus 10 described above may be realized by a computer that includes a controller, such as a central processing unit (CPU), a memory, an input-output unit that transmits and receives data to and from an external device, and so on and that reads out a program stored in a computer-readable information storage medium to execute the program that is read out. The program may be supplied to the image processing apparatus 10, which is the computer, via the information storage medium, such as an optical disk, a magnetic disk, a magnetic tape, a magneto-optical disk, or a flash memory, or may be supplied to the image processing apparatus 10 via a data communication network, such as the Internet. The functions of the blocks illustrated in FIG. 1 will now be described in detail.

The learning information accepting unit 11 accepts leaning information from, for example, an input apparatus or an external device (a user terminal, etc.) connected to the image processing apparatus 10. For example, the learning information accepting unit 11 may accept a file path of a sample image used in the leaning, area specification data specifying a partial image area (a leaning area) used in the learning process in the sample image, and/or information about the type of an object to be learned with the sample image.

The sample image acquiring unit 12 acquires the sample image used in the learning process on the basis of the leaning information accepted by the learning information accepting unit 11. For example, the sample image acquiring unit 12 may acquire the sample image on the basis of the file path of the sample image accepted by the learning information accepting unit 11. The sample image may be acquired from a memory in the image processing apparatus 10 or may be acquired from a database outside the image processing apparatus 10.

The local image feature generating unit 13 generates a local image feature for the sample image acquired by the sample image acquiring unit 12. For example, the local image feature generating unit 13 generates a local feature on the basis of image information in a certain area around a pixel (or a pixel group composed of multiple pixels) (or a base point, which is any coordinate included in the pixel or the pixel group) for each of all or part of the pixels (or the pixel groups) of the sample image. For example, one or more of an RGB value, a Scale-Invariant Feature Transform (SIFT) feature, a Histogram of Oriented Gradients (HOG) feature, and a Gabor feature of the pixel may be used as the local feature. The local image feature generating unit 13 may set areas of multiple sizes (scales) for the pixels in the sample image to generate the local feature for the area of each size.

The local image feature cluster setting unit 14 divides the local feature generated by the local image feature generating unit 13 into multiple clusters to hold information about the center of each cluster. For example, the local image feature cluster setting unit 14 may divide the local features acquired for multiple sample images into clusters with k-Means clustering. In the present exemplary embodiment, a classification number is added to each cluster of the local feature and the number of clusters may be about several thousands. The local image feature cluster setting unit 14 may store information about the clusters concerning the local feature in, for example, the classification model parameter memory 20.

The local image feature quantization unit 15 quantizes the local feature on the basis of which cluster, among the multiple clusters set by the local image feature cluster setting unit 14, the local feature generated by the local image feature generating unit 13 belong to. For example, the local image feature quantization unit 15 may replace the local feature generated by the local image feature generating unit 13 with the classification number of the cluster to which the local feature belongs to quantize the local feature.

The learning area setting unit 16 sets one or more partial image areas (leaning areas) used in the learning process in the sample image on the basis of the leaning information accepted by the learning information accepting unit 11. For example, the learning area setting unit 16 may set one or more leaning areas in the sample image on the basis of the area specification data accepted by the learning information accepting unit 11. At least some of the leaning areas may be overlapped with each other. In particular, some of the leaning areas may be set so as to be overlapped with each other for the area including an object to be learned. Although a case in which the leaning area has a rectangular shape is exemplified in the present exemplary embodiment, the leaning area may have a shape other than the rectangle.

The rectangle feature value generating unit 17 generates a feature value of the leaning area (rectangular area) on the basis of the local feature (furthermore, the distribution of the local features) that is included in the leaning area (rectangular area) set by the learning area setting unit 16 and that is quantized. For example, the rectangle feature value generating unit 17 may generate the feature value as a rectangle feature value on the basis of a histogram that is generated by counting the frequency of the local feature (that is, the cluster number) quantized for each pixel included in the target rectangular area. For example, the rectangle feature value generating unit 17 may generate the histogram that is normalized by dividing the frequency of each cluster number by the number of pixels included in the rectangular area. Since the rectangle feature value is a vector of several-thousand dimensions, the vector may be compressed into a low dimensional vector. For example, in order to compress the dimension of the vector, many rectangle feature values may be prepared in advance, an eigenvector may be calculated with principal component analysis (PCA), and the rectangle feature value may be projected on a subspace composed of a few eigenvectors each having a high eigenvalue to compress the dimension. Alternatively, the subspace in which the correlation between the rectangle feature value and an image category is increased may be calculated with canonical correlation analysis (CCA) using the kind of the object (the image category) added to the sample image for the leaning to compress the dimension.

The rectangle feature value memory 18 holds each rectangular area set by the learning area setting unit 16 in association with the rectangle feature value generated by the rectangle feature value generating unit 17 and the kind of the object (the image category) accepted by the learning information accepting unit 11 for the rectangular area. The rectangle feature value memory 18 may hold each rectangular area in association with information about the position (the coordinate position) and the size of the rectangular area.

The machine learning unit 19 learns the classifier corresponding to each object kind on the basis of the rectangle feature value and the kind of the object (the image category) held in the rectangle feature value memory 18. For example, the machine learning unit 19 may associate each object kind with a classifier identifier (ID) on a one-to-one basis to execute the learning process based on the rectangle feature value associated with the kind of the object corresponding to the classifier for every classifier identified by the classifier ID. For example, the machine learning unit 19 may execute the learning process with an X-th classifier (classification model) corresponding to a car when the object is the car and may execute the learning process with a Y-th classifier (classification model) corresponding to a person when the object is the person. The machine learning unit 19 may store leaning parameters of first to N-th (N is an integer larger than or equal to one) classifiers corresponding to the kinds of the objects in the classification model parameter memory 20.

The machine learning unit 19 may perform clustering of the size and the position of the rectangular area for every object kind to store a rectangular area setting parameter including information about the size and the position of a typical rectangular area corresponding to the kind of the object (a coordinate position, the amount of movement at the coordinate position, etc.) in an i-th (i is any integer from one to N) classification model parameter memory 20-*i* corresponding to the kind of the object.

Although a high-speed classifier, such as a nearest neighbor classifier or a random forest classifier, is desirable as the classifier, a Gaussian mixture model or a support vector machine may be used. Multiple image categories may be classified with one classifier when the nearest neighbor classifier or the random forest classifier is used, and the classifiers of the number of the image categories may be prepared when the Gaussian mixture model or the support vector machine is used.

The classification model parameter memory 20 includes first to N-th (N is an integer larger than or equal to one) classification model parameter memories 20-1 to 20-N. The i-th (i is any integer from one to N) classification model parameter memory 20-*i* stores a classification model parameter identifying a classification condition (a classification hyperplane, etc.) of the rectangle feature value learned by the machine learning unit 19 for the kind of the object corresponding to an i-th classification model. The i-th classification model parameter memory 20-$i$ may further store the information about the size and the position of the typical rectangular area, which is learned on the basis of the rectangular area used in the leaning.

The exemplary functions of the image processing apparatus 10 concerning the learning process are described above. Next, exemplary functions of the image processing apparatus 10 concerning a process to classify an object from an image with the classifier will be described with reference to FIG. 2.

[1-2. Description of Functional Blocks Concerning Classification Process]

Figure 2:
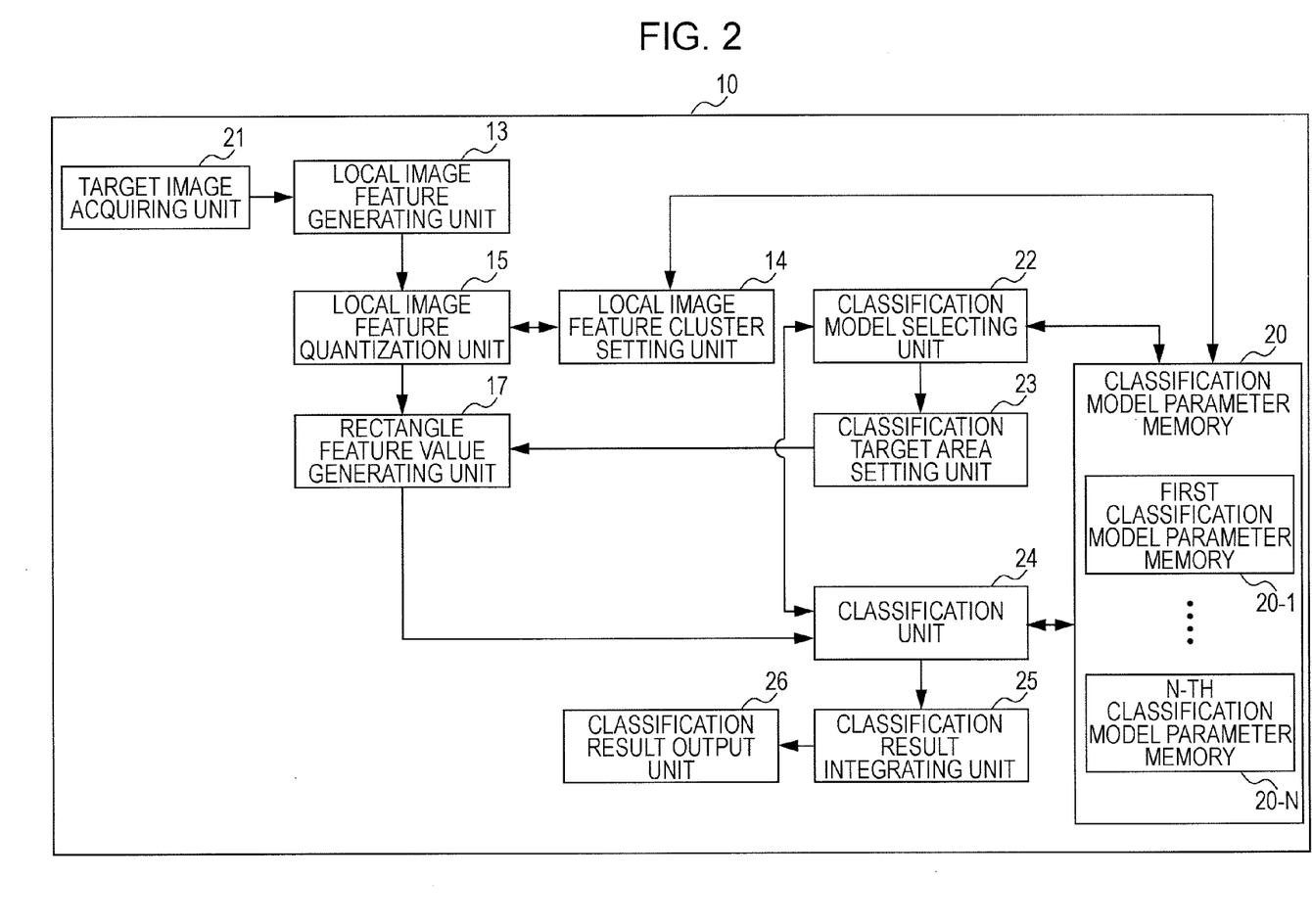
FIG. 2 illustrates exemplary functions of the image processing apparatus concerning a classification process.

Referring to FIG. 2, the image processing apparatus 10 includes a target image acquiring unit 21, the local image feature generating unit 13, the local image feature cluster setting unit 14, the local image feature quantization unit 15, a classification model selecting unit 22, a classification target area setting unit 23, the rectangle feature value generating unit 17, a classification unit 24, the classification model parameter memory 20, a classification result integrating unit 25, and a classification result output unit 26.

The functions of the blocks in the image processing apparatus 10 described above may be realized by a computer that includes a controller, such as a CPU, a memory, an input-output unit that transmits and receives data to and from an external device, and so on and that reads out a program stored in a computer-readable information storage medium to execute the program that is read out. The program may be supplied to the image processing apparatus 10, which is the computer, via the information storage medium, such as an optical disk, a magnetic disk, a magnetic tape, a magneto-optical disk, or a flash memory, or may be supplied to the image processing apparatus 10 via a data communication network, such as the Internet. The functions of the blocks illustrated in FIG. 2 will now be described in detail.

Figure 3:
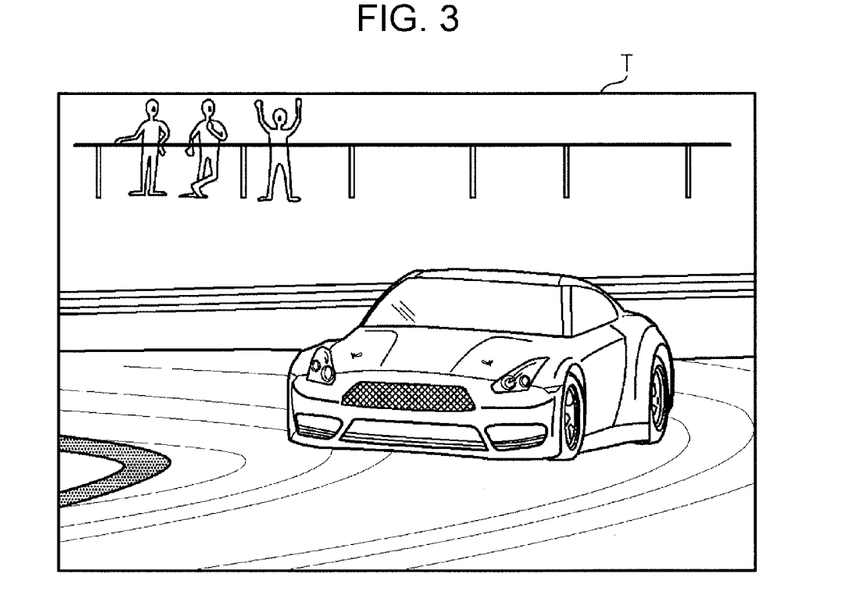
FIG. 3 illustrates an exemplary target image.

The target image acquiring unit 21 acquires an image to be subjected to the classification process (a target image). For example, the target image acquiring unit 21 may acquire the target image from an external device, such as a camera or a personal computer. FIG. 3 illustrates an example of a target image T acquired by the target image acquiring unit 21.

The local image feature generating unit 13 generates a local image feature for the target image acquired by the target image acquiring unit 21. For example, the local image feature generating unit 13 generates a local feature on the basis of image information in a certain area around a pixel (or a pixel group composed of multiple pixels) (or a base point, which is any coordinate included in the pixel or the pixel group) for each of all or part of the pixels (or the pixel groups) of the target image. For example, one or more of the RGB value, the SIFT feature, the HOG feature, and the Gabor feature of the pixel may be used as the local feature. The local image feature generating unit 13 may set areas of multiple sizes (scales) for the pixels in the target image to generate the local feature for the area of each size.

The local image feature cluster setting unit 14 sets information about each cluster of the local feature. For example, the local image feature cluster setting unit 14 may set the information about each cluster of the local feature on the basis of the information about the cluster of the local feature stored in the classification model parameter memory 20.

The local image feature quantization unit 15 quantizes the local feature on the basis of which cluster, among the multiple clusters set by the local image feature cluster setting unit 14, the local feature generated by the local image feature generating unit 13 belong to. For example, the local image feature quantization unit 15 may replace the local feature generated by the local image feature generating unit 13 with the classification number of the cluster to which the local feature belongs to quantize the local feature.

The classification model selecting unit 22 selects a classification model used in the classification from first to N-th (N is an integer larger than or equal to one) classification models. For example, the classification model selecting unit 22 may select a classification model that is specified when the specification is made and may sequentially select the first to N-th classification models in ascending order (or in descending order) of the numbers of the classification models when the specification is not made.

The classification target area setting unit 23 sets multiple partial image areas (classification target areas) to be classified in the target image. For example, the classification target area setting unit 23 may move the rectangular areas having one or more predetermined sizes, in the target image, by a predetermined amount of shift to set the multiple classification target areas. When the i-th (i is any integer from one to N) classification model is selected by the classification model selecting unit 22, the classification target area setting unit 23 may refer to the rectangular area setting parameter stored in the i-th classification model parameter memory 20-$i$ to set the multiple classification target areas on the basis of the information about the size and the position indicated in the rectangular area setting parameter. The classification target area setting unit 23 may set the positions of the partial image areas so that at least some of the multiple partial image areas set in the target image are overlapped with each other. Although a case in which the classification target area has a rectangular shape is exemplified in the present exemplary embodiment, the classification target area may have a shape other than the rectangle.

Figure 4:
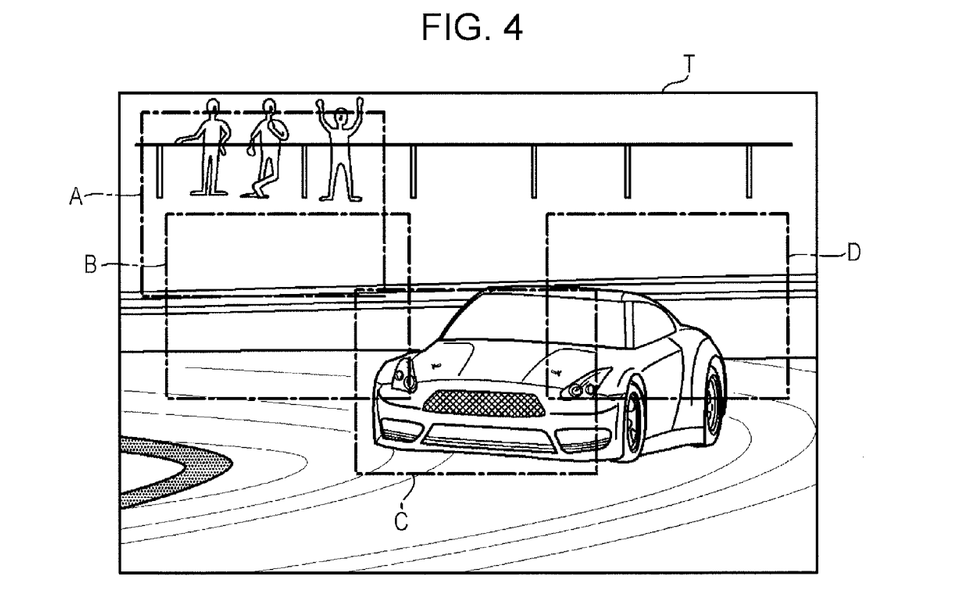
FIG. 4 illustrates exemplary multiple classification target areas set for the target image.

FIG. 4 illustrates exemplary multiple classification target areas set by the classification target area setting unit 23 for the target image T. An example in which four classification target areas A, B, C, and D are set for the target image T is illustrated in FIG. 4.

The rectangle feature value generating unit 17 generates a feature value of the classification target area (rectangular area) on the basis of the local feature that is included in the classification target area (rectangular area) set by the classification target area setting unit 23 and that is quantized. For example, the rectangle feature value generating unit 17 may generate the feature value as the rectangle feature value on the basis of the histogram that is generated by counting the frequency of the local feature (that is, the cluster number) quantized for each pixel included in the target rectangular area. For example, the rectangle feature value generating unit 17 may generate the histogram that is normalized by dividing the frequency of each cluster number by the number of pixels included in the rectangular area. Since the rectangle feature value is a vector of several-thousand dimensions, the vector may be compressed into a low dimensional vector. For example, in order to compress the dimension of the vector, many rectangle feature values may be prepared in advance, an eigenvector may be calculated with the principal component analysis (PCA), and the rectangle feature value may be projected on a subspace composed of a few eigenvectors each having a high eigenvalue to compress the dimension. Alternatively, the subspace in which the correlation between the rectangle feature value and the image category is increased may be calculated with the canonical correlation analysis (CCA) using the kind of the object (the image category) added to the sample image for the leaning to compress the dimension.

The classification model parameter memory 20 includes the first to N-th (N is an integer larger than or equal to one) classification model parameter memories 20-1 to 20-N. The i-th (i is any integer from one to N) classification model parameter memory 20-i stores the classification model parameter identifying the classification condition of the rectangle feature value learned by the machine learning unit 19 illustrated in FIG. 1 for the kind of the object corresponding to the i-th classification model.

The classification unit 24 calculates the probability that the object to be classified with the i-th classification model is included in the classification target area or an evaluation value (score), which is a monotonically increasing function of correlation, on the basis of the rectangle feature value generated for each of the multiple classification target areas and the classification model parameter that is stored in the i-th classification model parameter memory 20-i corresponding to the i-th classification model selected by the classification model selecting unit 22 and that is learned. A case in which the probability is used as the evaluation value is exemplified in the present exemplary embodiment.

The classification result integrating unit 25 generates a final classification result on the basis of the classification result (probability), calculated by the classification unit 24, of each of the multiple classification target areas set by the classification target area setting unit 23 for the target image. For example, the classification result integrating unit 25 may extract part of the classification results (probabilities) meeting a predetermined condition, among the multiple classification results (probabilities) of the multiple classification target areas with the i-th classification model, to obtain the average or the product of the extracted classification results (probabilities) as an existence probability of the object to be classified with the i-th classification model. In a specific example, the classification result integrating unit 25 may extract the classification results (probabilities) of a predetermined number or ratio counted from the classification result having the highest value, among the classification results (probabilities) of the multiple classification target areas with the i-th classification model, to obtain the average (or the sum) of the extracted classification results (probabilities) as the existence probability (or a final score) of the object to be classified with the i-th classification model. In another specific example, the classification result integrating unit 25 may extract the classification results (probabilities) that are higher than or equal to a predetermined threshold value (or higher than the threshold value), among the classification results (probabilities) of the multiple classification target areas with the i-th classification model, to obtain the average (or the sum) of the extracted classification results (probabilities) as the existence probability (or the final score) of the object to be classified with the i-th classification model.

Alternatively, the classification result integrating unit 25 may obtain the average (or the sum) of the classification results (probabilities) of the multiple classification target areas with the i-th classification model as the existence probability (or the final score) of the object to be classified with the i-th classification model.

Alternatively, the classification result integrating unit 25 may determine that the object to be classified with the i-th classification model is included if the number of the classification results higher than or equal to a threshold value is larger than the number of the classification results lower than the threshold value, among the classification results (probabilities) of the multiple classification target areas with the i-th classification model, and otherwise may determine that the object to be classified with the i-th classification model is not included.

Figure 5:
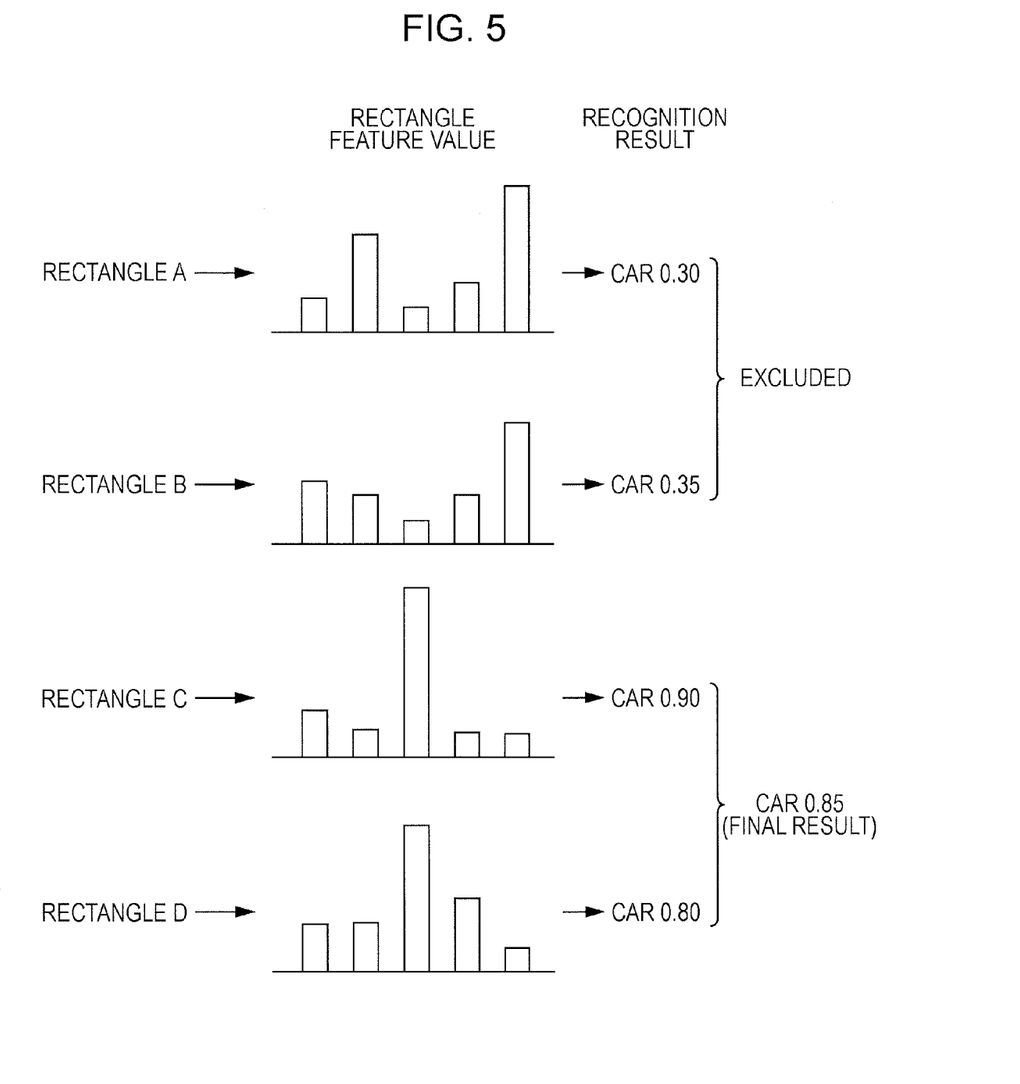
FIG. 5 is a diagram for describing an exemplary process of integrating classification results.

An exemplary process of integrating the classification results by the classification result integrating unit 25 will now be described with reference to FIG. 5. As illustrated in FIG. 5, the rectangle feature values (histograms) are generated by the rectangle feature value generating unit 17 for the respective classification target areas A, B, C, and D, set in FIG. 4 to obtain the classification result (probability), for example, with a classification model the classification target of which is a car on the basis of the generated rectangle feature values. The classification result integrating unit 25 extracts, for example, the top two classification results (or the classification results higher than or equal to a threshold value of 0.5), among the classification results of the classification target areas, to obtain the average of the extracted classification results as the final result. Since the rectangle A and the rectangle B are probably noise, such as background, in this case, it is possible to execute the process of classifying the object on the basis of the classification target areas other than the noise.

The classification result output unit 26 outputs the final classification result obtained by the classification result integrating unit 25. For example, the classification result output unit 26 may supply the final classification result with the i-th (i is any integer from one to N) classification model to a user (user terminal), along with information about the target object to be classified with the i-th classification model.

[2. Description of Flows]

Exemplary processes executed by the image processing apparatus 10 will now be described with reference to flowcharts illustrated in FIG. 6 to FIGS. 9A and 9B.

[2-1. Description of Flow Concerning Learning Process]

Figure 6:
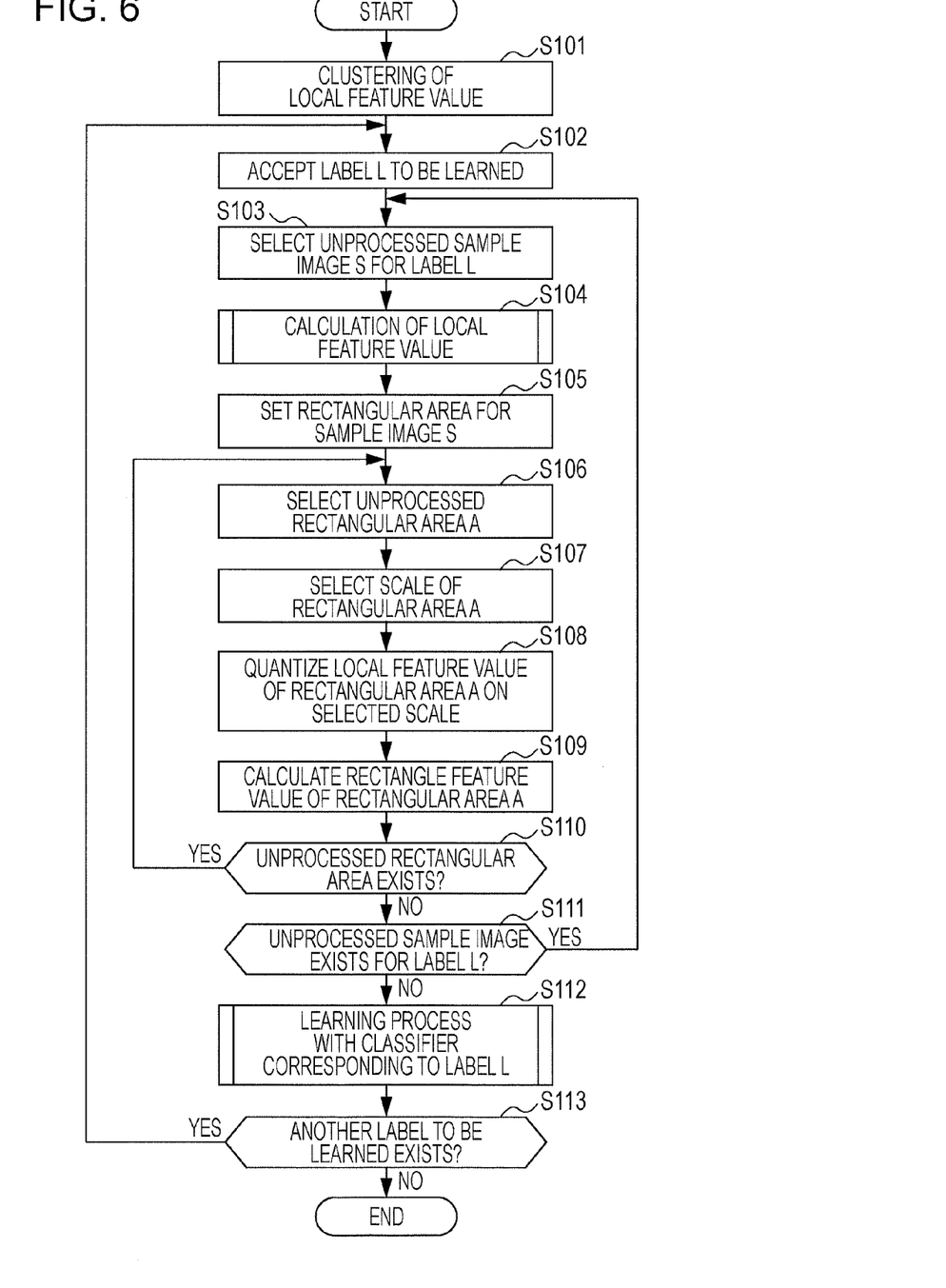
FIG. 6 is a flowchart illustrating an example of the learning process.

FIG. 6 is a flowchart illustrating an example of the learning process executed by the image processing apparatus 10. Referring to FIG. 6, in Step S101, the image processing apparatus 10 performs clustering of the local feature value that is acquired from the sample image for leaning in advance. The image processing apparatus 10 stores the information about the center of each cluster.

In Step S102, the image processing apparatus 10 accepts a label (kind or category) L of an object to be learned, for example, from the user (or the user terminal). In Step S103, the image processing apparatus 10 acquires the sample images including the object of the label L and selects a sample image S that is not processed from the acquired sample images.

In Step S104, the image processing apparatus 10 calculates the local feature value for the sample image S selected in Step S103. The calculation of the local feature value for the image will now be described with reference to a flowchart in FIG. 7.

[2-1-1. Calculation of Local Feature Value]

Figure 7:
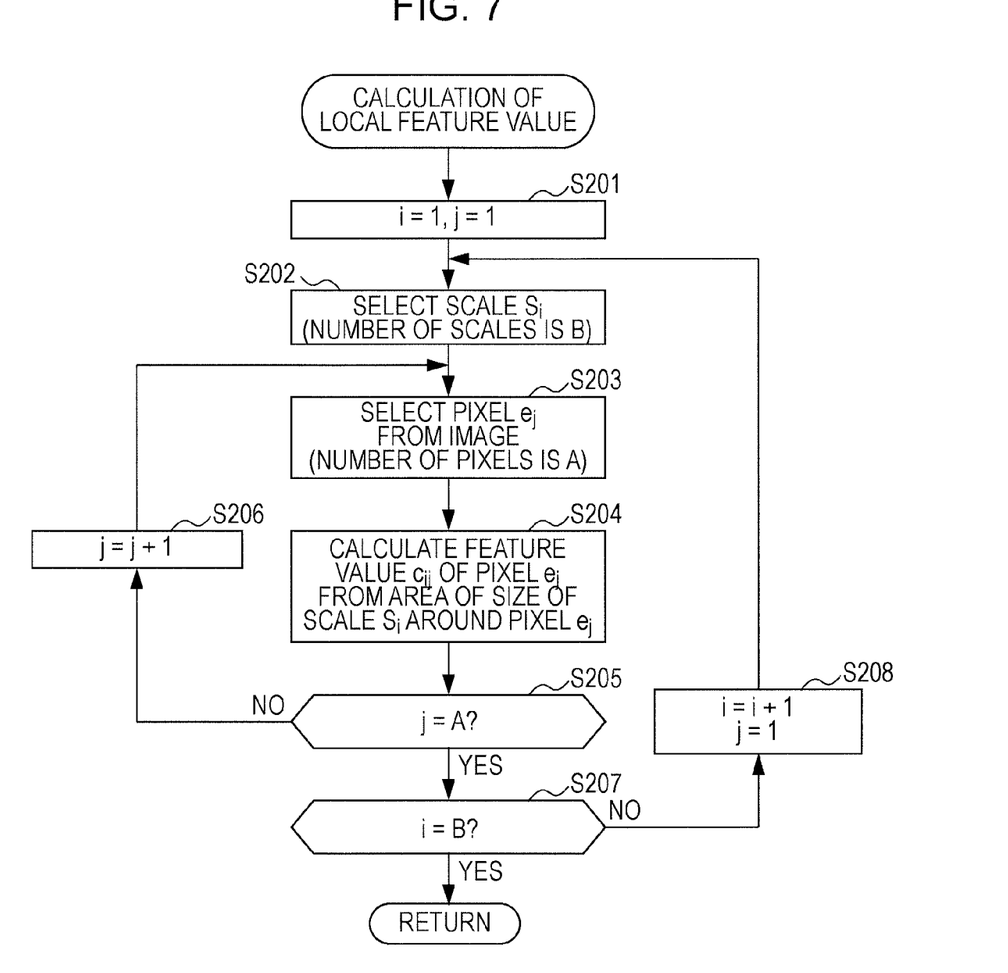
FIG. 7 is a flowchart illustrating an exemplary process of calculating a local feature value.

FIG. 7 is a flowchart illustrating an exemplary process of calculating the local feature value. In the flowchart illustrated in FIG. 7, it is assumed that the number of pixels of the image for which the local feature value is to be calculated is A (A is an integer larger than or equal to one) and the number of scales is B (B is an integer larger than or equal to one).

Referring to FIG. 7, in Step S201, the image processing apparatus 10 initializes a variable i and a variable j to one. In Step S202, the image processing apparatus 10 selects a scale $S_i$. In the example in FIG. 7, it is assumed that scales $S_1$ to $S_B$ exist, the scale $S_i$ is represented by pixels of $S_i \times S_i$, and $S_i < S_{i+1}$.

In Step S203, the image processing apparatus 10 selects a pixel $e_j$ from the target image (pixels $e_1$ to $e_A$). In Step S204, the image processing apparatus 10 calculates a local feature value $c_{ij}$ of the pixel $e_j$ from an area of the size of the scale $S_i$ around the selected pixel $e_j$. The local feature value $c_{ij}$ may be, for example, the average of the RGB values, the SIFT feature, the HOG feature, or the Gabor feature of the pixels included in the area of the size of the scale $S_i$ around the pixel $e_j$.

In Step S205, the image processing apparatus 10 determines whether the variable j reaches A. If the image processing apparatus 10 determines that the variable j does not reach A (NO in Step S205), in Step S206, the image processing apparatus 10 increments the variable j (adds one). Then, the process goes back to Step S203. If the image processing apparatus 10 determines that the variable j reaches A (YES in Step S205), in Step S207, the image processing apparatus 10 determines whether the variable i reaches B. If the image processing apparatus 10 determines that the variable i does not reach B (NO in Step S207), in Step S208, the image processing apparatus 10 increments the variable i (adds one) and initializes the variable j to one. Then, the process goes back to Step S202. If the image processing apparatus 10 determines that the variable j reaches A (YES in Step S205) and that the variable i reaches B (YES in Step S207), the process of calculating the local feature value is terminated and returns to the process in FIG. 6.

Referring back to FIG. 6, upon completion of the calculation of the local feature value of the sample image S (Step S104), in Step S105, the image processing apparatus 10 sets one or more rectangular areas for the sample image S on the basis of the area specification data accepted from, for example, the user (or the user terminal).

In Step S106, the image processing apparatus 10 selects an unprocessed rectangular area A from the rectangular areas set for the sample image S. In Step S107, the image processing apparatus 10 selects a scale on the basis of the size of the selected rectangular area A. For example, the image processing apparatus 10 may define the range of the size for each of the scales $S_1$ to $S_B$ to select a scale on the basis of which scale the range of the size of the rectangular area A corresponds to.

In Step S108, the image processing apparatus 10 quantizes the local feature value of the rectangular area A on the scale (for example, a scale $S_k$) selected in Step S107 on the basis of the result of the clustering in Step S101. For example, the local feature values of the pixels $e_1$ to $e_A$ of the sample image S on the scale $S_k$ are $c_{1k}$ to $c_{Ak}$. The image processing apparatus 10 converts the local feature values $c_{1k}$ to $c_{Ak}$ to the classification numbers of the clusters to which the local feature values $c_{1k}$ to $c_{Ak}$ belong on the basis of which clusters of the local feature values the local feature values $c_{1k}$ to $c_{Ak}$ belong to.

In Step S109, the image processing apparatus 10 calculates the rectangle feature value on the basis of the frequency distribution of the local feature value quantized for each pixel included in the rectangular area A. For example, the image processing apparatus 10 may use the histogram that is generated by counting the frequency of the local feature value quantized for each pixel included in the rectangular area A as the rectangle feature value.

In Step S110, the image processing apparatus 10 determines whether any unprocessed rectangular area is included in the rectangular areas set in Step S105. If the image processing apparatus 10 determines that any unprocessed rectangular area is included in the rectangular areas set in Step S105 (YES in Step S110), the process goes back to Step S106. If the image processing apparatus 10 determines that no unprocessed rectangular area is included in the rectangular areas set in Step S105 (NO in Step S110), the process goes to Step S111.

In Step S111, the image processing apparatus 10 determines whether any unprocessed sample image exists for the label L of the object. If the image processing apparatus 10 determines that any unprocessed sample image exists for the label L of the object (YES in Step S111), the process goes back to Step S103. If the image processing apparatus 10 determines that no unprocessed sample image exists for the label L of the object (NO in Step S111), in Step S112, the image processing apparatus 10 executes the learning process with the classifier corresponding to the label L on the basis of the rectangle feature value calculated for the label L. The learning process with the classifier corresponding to the label L will now be described with reference to a flowchart illustrated in FIG. 8.

[2-1-2. Learning Process with Classifier]

Figure 8:
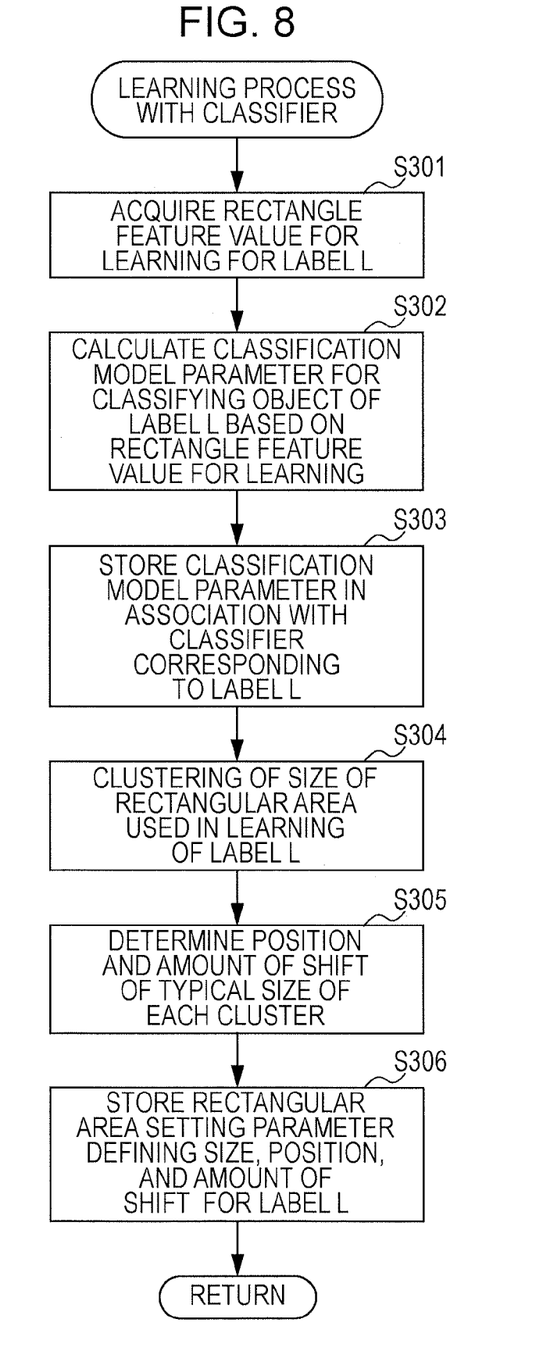
FIG. 8 is a flowchart illustrating an exemplary learning process with a classifier.

Referring to FIG. 8, in Step S301, the image processing apparatus 10 acquires the rectangle feature value for leaning calculated for the label L. In Step S302, the image processing apparatus 10 calculates the classification model parameter for classifying the object of the label L on the basis of the acquired rectangle feature value for leaning. In Step S303, the image processing apparatus 10 stores the calculated classification model parameter in association with the classifier corresponding to the label L.

In Step S304, the image processing apparatus 10 performs clustering of the size of the rectangular area used in the leaning of the label L to determine a typical size. In Step S305, the image processing apparatus 10 determines the position and the amount of shift of each typical size resulting from the clustering on the basis of the rectangular area used in the leaning of the label L. In Step S306, the image processing apparatus 10 stores the rectangular area setting parameter defining the size, the position, the amount of shift, and so on of the rectangular area in association with the classifier corresponding to the label L. Then, the process returns to the process in FIG. 6.

Referring back to FIG. 6, upon completion of the learning process with the classifier corresponding to the label L, in Step S113, the image processing apparatus 10 determines whether another label to be learned exists. If the image processing apparatus 10 determines that another label to be learned exists (YES in Step S113), the process goes back to Step S102. If the image processing apparatus 10 determines that no label to be learned exists (NO in Step S113), the learning process is terminated.

[2-2. Description of Flow Concerning Classification Process]

Figure 9A:
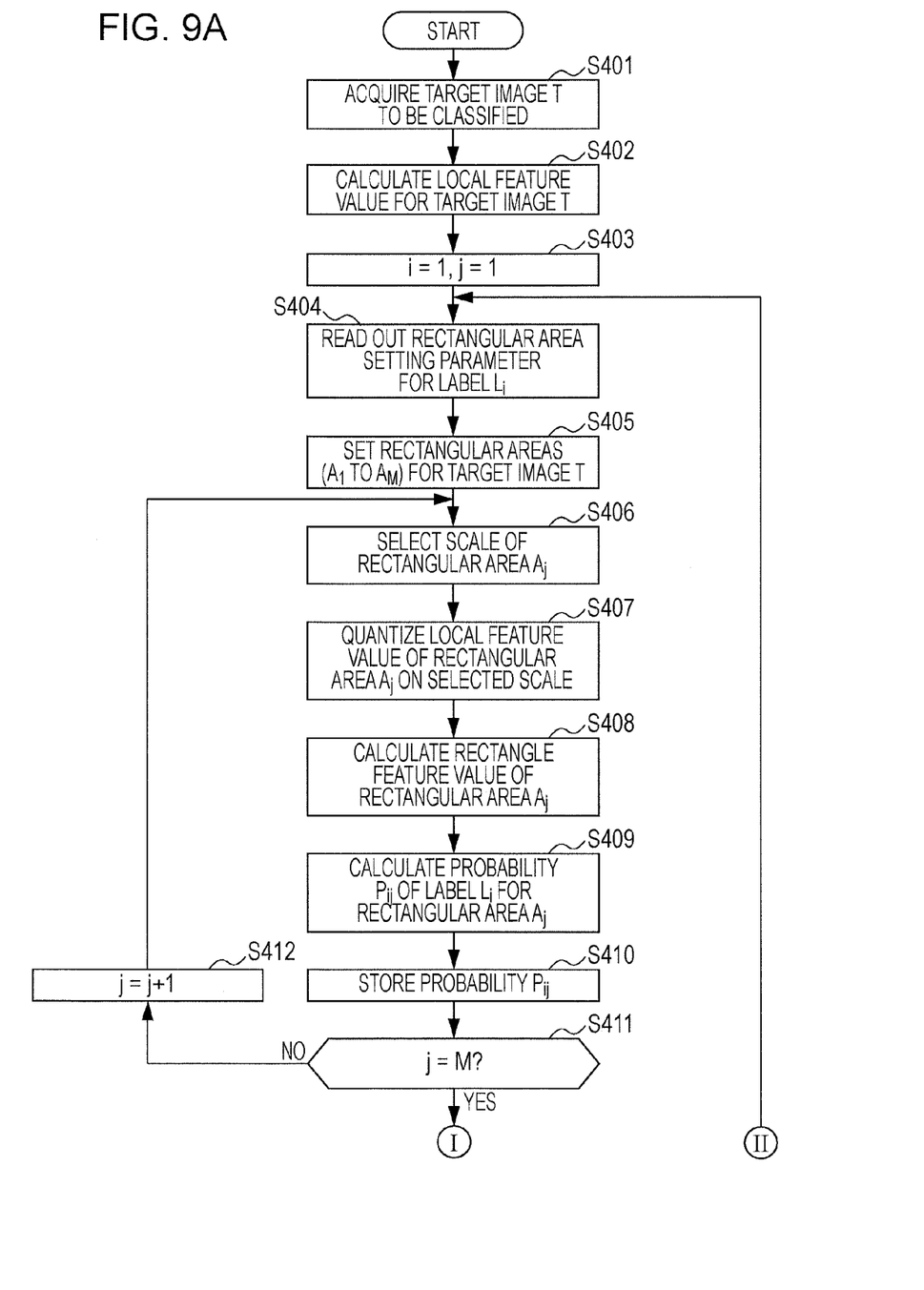
FIGS. 9A and 9B are flowcharts illustrating an example of the classification process.
Figure 9B:
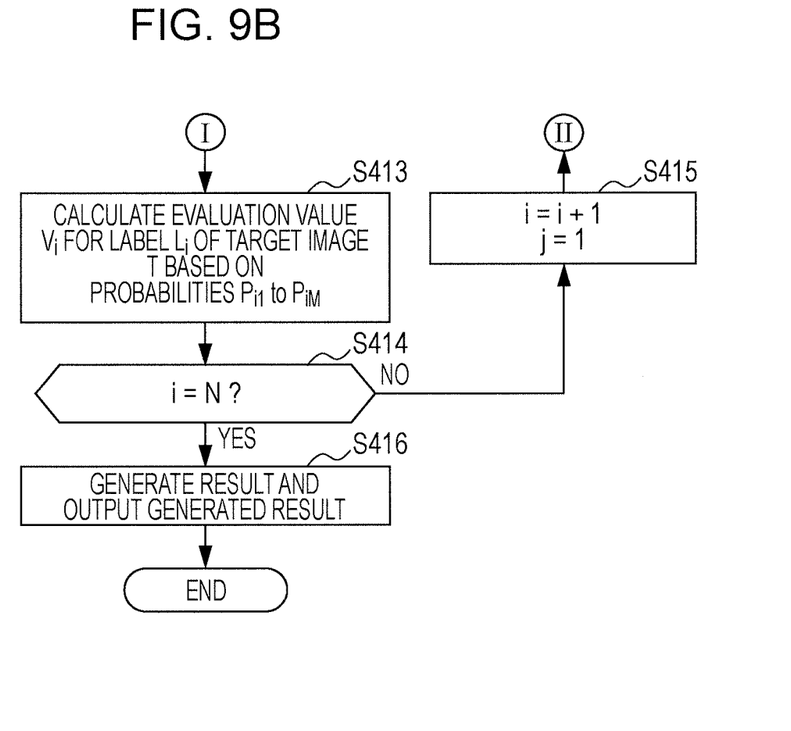

FIGS. 9A and 9B are flowcharts illustrating an example of the process of classifying an object in an image to be classified (target image).

Referring to FIGS. 9A and 9B, in Step S401, the image processing apparatus 10 acquires the target image T to be classified. In Step S402, the image processing apparatus 10 calculates the local feature value for the target image T. The calculation of the local feature value may be executed according to the flowchart illustrated in FIG. 7.

In Step S403, the image processing apparatus 10 initializes the variable i and the variable j to one. In Step S404, the image processing apparatus 10 reads out the rectangular area setting parameter stored in association with the classifier corresponding to a label $L_i$ (the label $L_i$ corresponds to the i-th (i=1 to N) classification model).

In Step S405, the image processing apparatus 10 sets multiple rectangular areas ($A_1$ to $A_M$) (M is an integer larger than or equal to two) for the target image T on the basis of the rectangular area setting parameter read out in Step S404.

In Step S406, the image processing apparatus 10 selects a scale of a rectangular area $A_j$ set for the target image T on the basis of the size of the rectangular area A. For example, the image processing apparatus 10 may define the range of the size for each of the scales $S_1$ to $S_B$ to select a scale on the basis of which scale the range of the size of the rectangular area $A_j$ corresponds to.

In Step S407, the image processing apparatus 10 quantizes the local feature value of the rectangular area $A_j$ on the scale (for example, the scale $S_k$) selected in Step S406 on the basis of the result of the clustering in Step S101. Since the quantization of the local feature value is executed in the same manner as in the quantization of the local feature value in the learning process, a description of the quantization of the local feature value in the classification process is omitted herein.

In Step S408, the image processing apparatus 10 calculates the rectangle feature value on the basis of the frequency of the local feature value quantized for each pixel included in the rectangular area $A_j$. For example, the image processing apparatus 10 may use the histogram that is generated by counting the frequency of the local feature value quantized for each pixel included in the rectangular area $A_j$ as the rectangle feature value.

In Step S409, the image processing apparatus 10 calculates a probability $P_{ij}$ that the object of the label $L_i$ is included in the rectangular area $A_j$ on the basis of the rectangle feature value of the rectangular area $A_j$ calculated in Step S408 and the i-th classification model parameter corresponding to the label $L_i$. In Step S410, the image processing apparatus 10 stores the calculated probability $P_{ij}$.

In Step S411, the image processing apparatus 10 determines whether the variable j reaches M. If the image processing apparatus 10 determines that the variable j does not reach M (NO in Step S411), in Step S412, the image processing apparatus 10 increments the variable j (adds one). Then, the process goes back to Step S406. If the image processing apparatus 10 determines that the variable j reaches M (YES in Step S411), the process goes to Step S413 in FIG. 9B.

In Step S413, the image processing apparatus 10 calculates the evaluation value for the label $L_i$ of the target image T on the basis of probabilities $P_{i1}$ to $P_{iM}$ calculated for the rectangular areas $A_1$ to $A_M$, respectively. For example, the image processing apparatus 10 may calculate the average of the top X (X is an integer that is larger than or equal to one and lower than M) probabilities, among the probabilities $P_{i1}$ to $P_{iM}$, as an evaluation value $V_i$ for the label $L_i$ of the target image T.

In Step S414, the image processing apparatus 10 determines whether the variable i reaches N. If the image processing apparatus 10 determines that the variable i does not reach N (NO in Step S414), in Step S415, the image processing apparatus 10 increments the variable i (adds one) and initializes the variable j to one. Then, the process goes back to Step S404 in FIG. 9A. If the image processing apparatus 10 determines that the variable i reaches N (YES in Step S414), in Step S416, the image processing apparatus 10 generates the classification result based on the evaluation value (probability) of each label concerning the target image T and outputs the generated classification result. Then, the classification process is terminated.

For example, the image processing apparatus 10 may identify the label corresponding to the evaluation value higher than or equal to a threshold value (or higher than the threshold value), among evaluation values $V_1$ to $V_N$ calculated for the labels $L_1$ to $L_N$ concerning the target image T, to output information about the identified label (the kind of the object).

The present invention is not limited to the above exemplary embodiments. For example, although the example in which the image processing apparatus 10 executes both the learning process and the classification process is described above in the above exemplary embodiments, a leaning apparatus executing the learning process and a classification apparatus executing the classification process may be separately provided. In this case, the leaning apparatus may have the functions described above with reference to FIG. 1 and the classification apparatus may have the functions described above with reference to FIG. 2.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a first acquiring unit that acquires an image to be processed;
   a setting unit that sets a plurality of partial image areas in the image to be processed;
   a second acquiring unit that, for each of the plurality of partial image areas, acquires a first classification result indicating a possibility that an object of a specific kind is included in the partial image area; and
   a generating unit that generates a second classification result indicating a possibility that the object of the specific kind is included in the image to be processed on the basis of the first classification results of the plurality of partial image areas,
   wherein the first classification result is a probability that the object of the specific kind is included, and
   wherein the generating unit generates the second classification result indicating the possibility that the object of the specific kind is included in the image to be processed on the basis of a sum or a product of the probabilities, which are the first classification results of the respective plurality of partial image areas, or a result of comparison between a number of the first classification results having the probabilities higher than or equal to a threshold value and a number of the first classification results having the probabilities lower than the threshold value.

2. The image processing apparatus according to claim 1, further comprising:
   an extracting unit that extracts part of the first classification result from the first classification results of the respective plurality of partial image areas,
   wherein the generating unit generates the second classification result indicating the possibility that the object of the specific kind is included in the image to be processed on the basis of the first classification result extracted by the extracting unit.

3. The image processing apparatus according to claim 2, wherein the first classification result is a probability that the object of the specific kind is included, and
   wherein the extracting unit extracts the first classification results of a predetermined number or ratio counted from the first classification result having a highest probability, among the first classification results of the respective plurality of partial image areas.

4. The image processing apparatus according to claim 2, wherein the first classification result is a probability that the object of the specific kind is included, and wherein the extracting unit extracts the first classification results having the probabilities higher than or equal to a threshold value, among the first classification results of the respective plurality of partial image areas.

5. The image processing apparatus according to claim 1, further comprising:
   a unit that causes a classifier to learn a classification condition of the object of the specific kind on the basis of an image feature of each of the partial image areas set for each of one or more sample images including the object of the specific kind,
   wherein the second acquiring unit acquires the first classification result indicating the possibility that the object of the specific kind is included in each of the plurality of partial image areas with the classifier on the basis of the image feature of the partial image area.

6. The image processing apparatus according to claim 5, further comprising:
   a partial area information learning unit that learns a feature concerning a position and a size of each of the partial image areas set in the sample image,
   wherein the setting unit sets the plurality of partial image areas in the image to be processed on the basis of the feature concerning the position and the size of each of the partial image areas learned by the partial area information learning unit.

7. The image processing apparatus according to claim 6, wherein the image feature of each of the partial image areas is generated on the basis of a distribution of a local feature of each of one or more pixels included in the partial image area.

8. The image processing apparatus according to claim 6, wherein the image feature of each of the partial image areas is generated on the basis of a distribution of a local feature of each of one or more pixels included in the partial image area.

9. The image processing apparatus according to claim 1, wherein the setting unit sets the plurality of partial image areas so that at least some of the plurality of partial image areas set in the image to be processed are overlapped with each other.

10. A non-transitory computer readable medium storing a program causing a computer to execute a process comprising:
    acquiring an image to be processed;
    setting a plurality of partial image areas in the image to be processed;
    acquiring, for each of the plurality of partial image areas, a first classification result indicating a possibility that an object of a specific kind is included in the partial image area; and
    generating a second classification result indicating a possibility that the object of the specific kind is included in the image to be processed on the basis of the first classification result of the plurality of partial image areas,
    wherein the first classification result is a probability that the object of the specific kind is included, and
    wherein the generating unit generates the second classification result indicating the possibility that the object of the specific kind is included in the image to be processed on the basis of a sum or a product of the probabilities, which are the first classification results of the respective plurality of partial image areas, or a result of comparison between a number of the first classification results having the probabilities higher than or equal to a threshold value and a number of the first classification results having the probabilities lower than the threshold value.

11. An image processing method comprising:
    acquiring an image to be processed;
    setting a plurality of partial image areas in the image to be processed;
    acquiring, for each of the plurality of partial image areas, a first classification result indicating a possibility that an object of a specific kind is included in the partial image area; and
    generating a second classification result indicating a possibility that the object of the specific kind is included in the image to be processed on the basis of the first classification result of each of the plurality of partial image areas,
    wherein the first classification result is a probability that the object of the specific kind is included, and
    wherein the generating unit generates the second classification result indicating the possibility that the object of the specific kind is included in the image to be processed on the basis of a sum or a product of the probabilities, which are the first classification results of the respective plurality of partial image areas, or a result of comparison between a number of the first classification results having the probabilities higher than or equal to a threshold value and a number of the first classification results having the probabilities lower than the threshold value.

* * * * *